(12) United States Patent
Lim et al.

(10) Patent No.: US 9,001,916 B2
(45) Date of Patent: Apr. 7, 2015

(54) METHOD OF TRANSMITTING SECRET INFORMATION AT TRANSMITTING END AND METHOD OF RECEIVING SECRET INFORMATION AT RECEIVING END, BASED ON MIMO MULTIPLEXING USING ANTENNAS

(71) Applicant: Samsung Electronics Co., Ltd., Suwon-si (KR)

(72) Inventors: Jong Bu Lim, Yongin-si (KR); Kyung Hun Jang, Suwon-si (KR); Mi Suk Huh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 32 days.

(21) Appl. No.: 13/893,415

(22) Filed: May 14, 2013

(65) Prior Publication Data
US 2013/0343479 A1    Dec. 26, 2013

(30) Foreign Application Priority Data

Jun. 25, 2012  (KR) .................. 10-2012-0067785

(51) Int. Cl.
*H04B 7/02* (2006.01)
*H04B 7/04* (2006.01)
(Continued)

(52) U.S. Cl.
CPC ............ *H04B 7/0456* (2013.01); *H04L 63/061* (2013.01); *H04W 12/04* (2013.01)

(58) Field of Classification Search
CPC .. H04B 7/0456; H04B 7/0413; H04B 7/0639; H04B 7/0473; H04L 63/061; H04W 12/04
USPC .................... 375/295, 316; 370/329, 335
See application file for complete search history.

(56) References Cited

U.S. PATENT DOCUMENTS

| 7,672,221 | B2 | 3/2010 | Fuji et al. |
| 8,559,403 | B2* | 10/2013 | Lee et al. ................. 370/335 |
| 2005/0047517 | A1 | 3/2005 | Gergios et al. |

(Continued)

FOREIGN PATENT DOCUMENTS

| JP | 2008-109466 A | 5/2008 |
| KR | 10-2007-0032040 A | 3/2007 |

(Continued)

OTHER PUBLICATIONS

International Search Report mailed on Oct. 18, 2013 for the counterpart International Application No. PCT/KR2013/005571 (3 pages, in English).

*Primary Examiner* — Daniel Washburn
*Assistant Examiner* — Eboni Hughes
(74) *Attorney, Agent, or Firm* — NSIP Law

(57) ABSTRACT

A method of transmitting secret information in a transmitting end and a method of receiving secret information at a receiving end, based on multi-input multi-output (MIMO) multiplexing using antennas, are provided. The method of transmitting includes selecting one or more indices of the secret information that correspond to at least one receiving antenna among receiving antennas, and mapping the one or more indices to an information vector. The method of transmitting further includes precoding the information vector based on channel information between transmitting antennas and the receiving antennas, and beamforming the precoded information vector, using the transmitting antennas.

17 Claims, 18 Drawing Sheets

(51) Int. Cl.
*H04L 29/06* (2006.01)
*H04W 12/04* (2009.01)

(56) References Cited

U.S. PATENT DOCUMENTS

| | | |
|---|---|---|
| 2007/0177729 A1 | 8/2007 | Reznik et al. |
| 2008/0069251 A1 | 3/2008 | Imai et al. |
| 2008/0094281 A1* | 4/2008 | Teng et al. .................... 342/368 |
| 2008/0304658 A1 | 12/2008 | Yuda et al. |
| 2009/0022049 A1 | 1/2009 | Zeng |
| 2010/0027697 A1* | 2/2010 | Malladi et al. ................ 375/260 |
| 2010/0027713 A1 | 2/2010 | Huang et al. |
| 2011/0170484 A1 | 7/2011 | Nagai et al. |
| 2013/0156010 A1* | 6/2013 | Dinan .......................... 370/335 |

FOREIGN PATENT DOCUMENTS

| | | |
|---|---|---|
| KR | 10-2007-0046824 A | 5/2007 |
| KR | 10-0981784 B1 | 9/2010 |

* cited by examiner

1800

METHOD OF TRANSMITTING SECRET INFORMATION AT TRANSMITTING END AND METHOD OF RECEIVING SECRET INFORMATION AT RECEIVING END, BASED ON MIMO MULTIPLEXING USING ANTENNAS

CROSS-REFERENCE TO RELATED APPLICATION(S)

This application claims the benefit under 35 U.S.C. §119 (a) of Korean Patent Application No. 10-2012-0067785, filed on Jun. 25, 2012, in the Korean Intellectual Property Office, the entire disclosure of which is incorporated herein by reference for all purposes.

BACKGROUND

1. Field

The following description relates to a method of transmitting secret information at a transmitting end and a method of receiving secret information at a receiving end, based on multi-input multi-output (MIMO) multiplexing using antennas.

2. Description of Related Art

In security technology used in a general communication system, layer-2 encryption or more than layer-3 encryption may be used. In addition, a scheme of coding data for transmission and reception between two communication devices using public key encryption or secret key encryption may be employed. In such a scheme, security may be obtained by a mathematical logic, irrespective of characteristics of a physical layer, that is, characteristics of a communication channel. Accordingly, if a third communication device obtains a method of decoding a cipher text through other paths, communication security between the two communication devices may be compromised. In particular, in a wireless communication system, third party eavesdropping may be readily performed due to broadcast characteristics of a wireless channel.

SUMMARY

In one general aspect, there is provided a method of transmitting secret information at a transmitting device, based on multi-input multi-output (MIMO) multiplexing using antennas, the method including selecting one or more indices of the secret information that correspond to at least one receiving antenna among receiving antennas, and mapping the one or more indices to an information vector. The method further includes precoding the information vector based on channel information between transmitting antennas and the receiving antennas, and beamforming the precoded information vector, using the transmitting antennas.

In another general aspect, there is provided a method of receiving secret information at a receiving device, based on multi-input multi-output (MIMO) multiplexing using antennas, the method including selecting at least one receiving antenna from receiving antennas based on a strength of a signal received through each of the receiving antennas, and detecting an information vector from the signal received through each of the at least one receiving antenna. The method further includes demapping the information vector to one or more indices of the secret information, and combining indices of the secret information.

In still another general aspect, there is provided a transmitting device configured to transmit secret information based on multi-input multi-output (MIMO) multiplexing using antennas, the transmitting device including a selecting unit configured to select one or more indices of the secret information that correspond to at least one receiving antenna among receiving antennas, and a mapping unit configured to map the one or more indices to an information vector. The transmitting device further includes a precoding unit configured to precode the information vector based on channel information between transmitting antennas and the receiving antennas, and a beamforming unit configured to beamform the precoded information vector, using the transmitting antennas.

In yet another general aspect, there is provided A receiving device configured to receive secret information based on multi-input multi-output (MIMO) multiplexing using antennas, the receiving device including a selecting unit configured to select at least one receiving antenna from receiving antennas based on a strength of a signal received through each of the receiving antennas, and a detecting unit configured to detect an information vector from the signal received through each of the at least one receiving antenna. The receiving device further includes a demapping unit configured to demap the information vector to one or more indices of the secret information, and a combination unit configured to combine indices of the secret information.

Other features and aspects will be apparent from the following detailed description, the drawings, and the claims.

Figure 1:
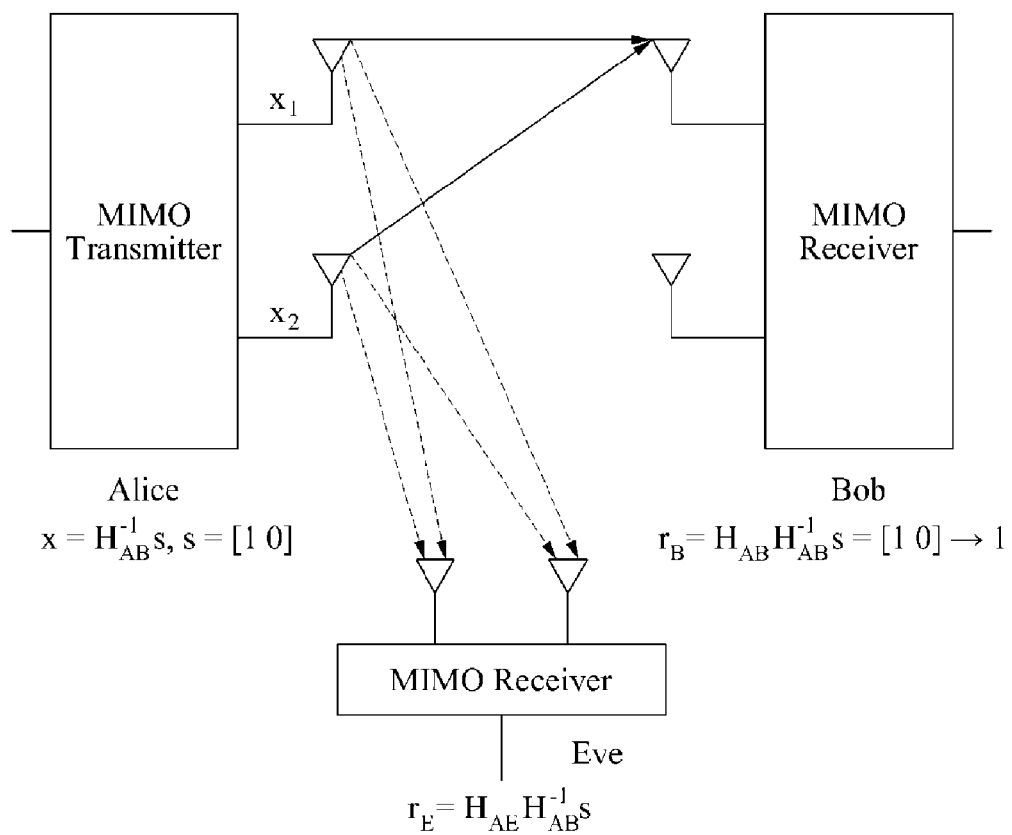
FIG. 1 is a diagram illustrating an example of a method of transmitting secret information at a transmitting end, and an example of a method of receiving the secret information at a receiving end, based on multi-input multi-output (MIMO) multiplexing using antennas.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

Herein, the term "transmitting end" may refer to a transmitting node or a transmitter, and the term "receiving end" may refer to a receiving node or a receiver.

FIG. 1 is a diagram illustrating an example of a method of transmitting secret information at a transmitting end, and an example of a method of receiving the secret information at a receiving end, based on multi-input multi-output (MIMO) multiplexing using antennas. In these examples, the transmitting end performs beamforming based on channel information between the transmitting end and the receiving end in an MIMO system, thereby enabling most of energy to be concentrated in a predetermined receiving antenna of the receiving end.

Referring to FIG. 1, communication may be performed securely between the transmitting end and the receiving end, by transmitting and receiving secret information based on MIMO multiplexing characteristics. The secret information may correspond to a secret key for encryption.

For example, let Alice be a legal transmitting end (i.e., an MIMO transmitter), let Bob be a legal receiving end (i.e., an MIMO receiver), and let Eve be an eavesdropper (i.e., another MIMO receiver). Bob, the legal receiving end, may be aware of channel information $H_{AB}$ between the legal transmitting end and the legal receiving end, and may receive a signal x (or $x_1$ or $x_2$), that is, $H_{AB}^{-1}s$, beamformed to a predetermined receiving antenna, for example, a first receiving antenna of the legal receiving end, based on MIMO multiplexing characteristics. Accordingly, when energy is received through different receiving antennas of the legal receiving end, Bob may determine that different pieces of information are transmitted from Alice, the legal transmitting end.

Although Eve, the eavesdropper, may be aware of only $H_{AE}$ between the legal transmitting end and the eavesdropper since energy is received through receiving antennas of the eavesdropper, Eve may be unaware of the channel information $H_{AB}$ between the legal transmitting end and the legal receiving end. Accordingly, Eve may fail to verify the signal x, for example, $H_{AB}^{-1}s$, precoded based on the channel information $H_{AB}$. Accordingly, Eve may be unaware of the information exchanged between Alice and Bob.

In addition, Eve may fail to decipher the exchanged information although Eve is aware of mapping rules based on a number of a receiving antenna of Bob at which the energy is received. The mapping rules may include, for example, a mapping rule to demap a received signal $r_B$ to indices or bits [1 0] when the signal x is beamformed to the first receiving antenna.

Through the methods described above, third party eavesdropping may be prevented in all wireless networks including, for example, a mobile wireless network, a wireless local area network (LAN), an ad-hoc network, and a machine-to-machine (M2M) network, for communication between devices or terminals. In addition, in the ad-hoc network or the M2M network in which secret information is not typically shared, secret information may be transmitted and received, or an encryption key may be shared, by protecting the secret information to be exchanged on a physical layer, or sharing randomness information unknown to a third party.

Figure 2:
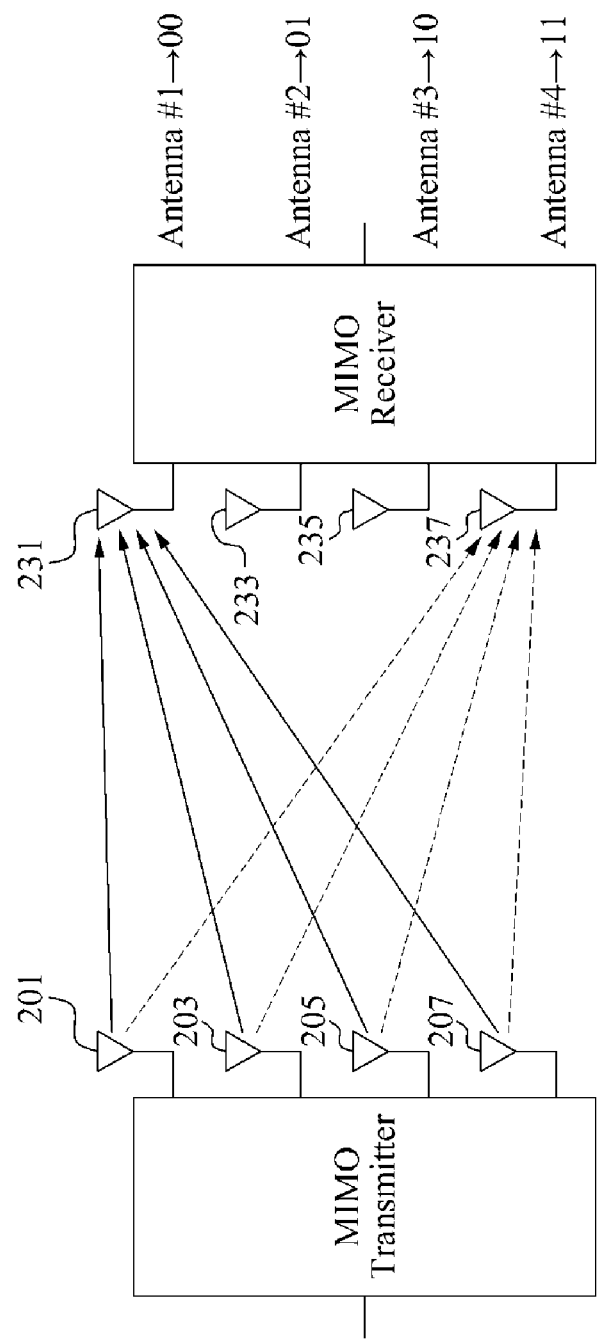
FIG. 2 is a diagram illustrating an example of a method of assigning indices to receiving antennas, respectively, based on MIMO multiplexing using antennas.

FIG. 2 is a diagram illustrating an example of a method of assigning indices to receiving antennas, respectively, based on MIMO multiplexing using antennas. Referring to FIG. 2, a transmitting end (i.e., an MIMO transmitter) and a receiving end (i.e., an MIMO receiver) predetermine and share layer mapping rules indicating indices or bits assigned to each of the receiving antennas of the receiving end.

For example, based on the layer mapping rules, four transmitting antennas 201, 203, 205, and 207 of the transmitting end perform transmission beamforming to a first receiving antenna 231 of the receiving end when bits "00" are to be transmitted, and perform transmission beamforming to a second receiving antenna 233 of the receiving end when bits "01" are to be transmitted. The four transmitting antennas 201, 203, 205, and 207 further perform transmission beamforming to a third receiving antenna 235 of the receiving end when bits "10" are to be transmitted, and perform transmission beamforming to a fourth receiving antenna 237 of the receiving end when bits "11" are to be transmitted.

As shown in FIG. 2, based on the layer mapping rules, the receiving end determines that the transmitting end transmits the bits "00" when a greatest energy is received through the first receiving antenna 231, and determines that the transmitting end transmits the bits "01" when a greatest energy is received through the second receiving antenna 233. In addition, the receiving end determines that the transmitting end transmits the bits "10" when a greatest energy is received through the third receiving antenna 235, and determines that the transmitting end transmits the bits "11" when a greatest energy is received through the fourth receiving antenna 237.

Figure 3:
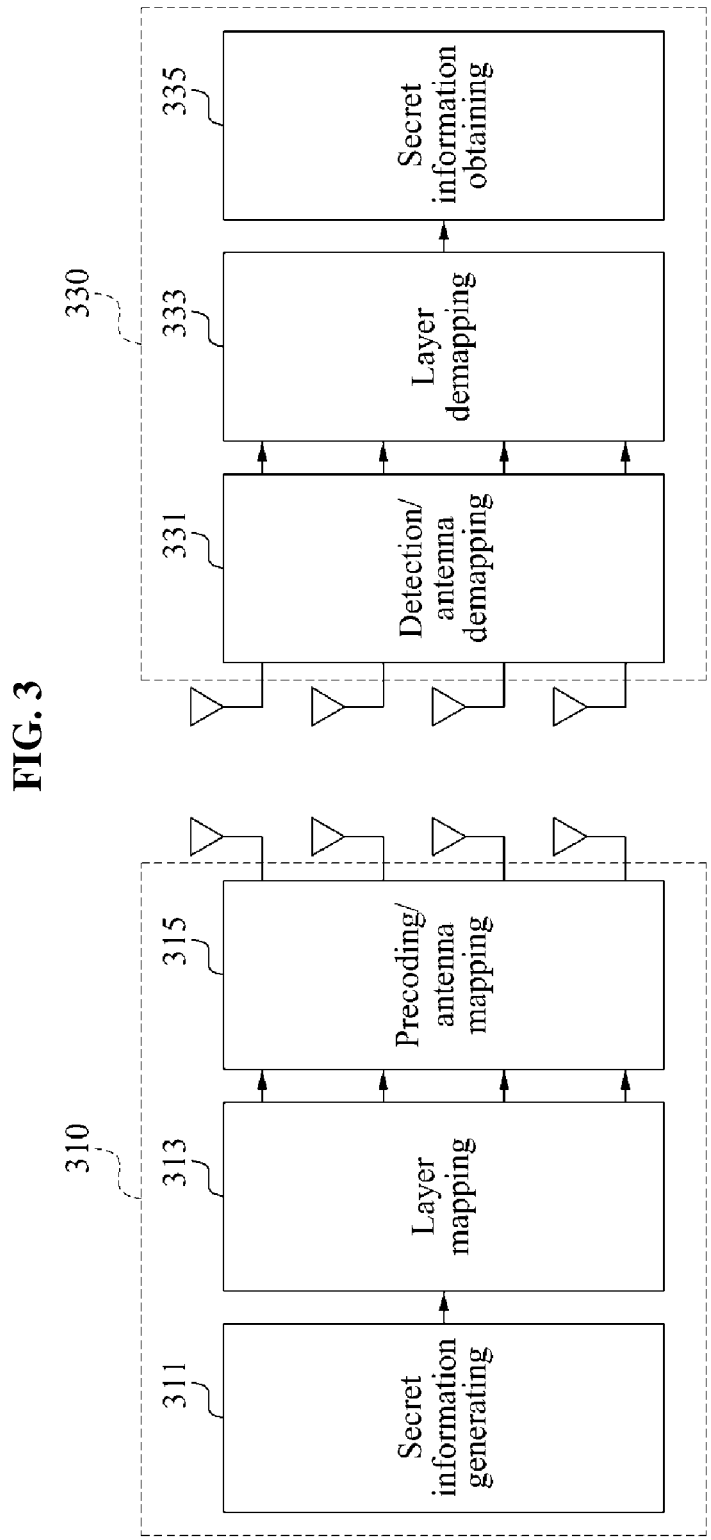
FIG. 3 is a diagram illustrating an example of a transmitting end that transmits secret information, and an example of a receiving end that receives the secret information, based on MIMO multiplexing using antennas.

FIG. 3 is a diagram illustrating an example of a transmitting end 310 that transmits secret information, and an example of a receiving end 330 that receives the secret information, based on MIMO multiplexing using antennas. Referring to FIG. 3, the transmitting end 310 includes a secret information generating unit 311, a layer mapping unit 313, and a precoding and antenna mapping unit 315. The receiving end 330 includes a detection and antenna demapping unit 331, a layer demapping unit 333, and a secret information obtaining unit 335.

In order to share secret information between the transmitting end 310 and the receiving end 330, the secret information generating unit 311 generates the secret information for encryption.

The layer mapping unit 313 determines a number of bits to be used to transmit the generated secret information during a time slot, based on a number of receiving antennas of the receiving end 330. The layer mapping unit 313 also maps the bits of the secret information to an information vector to be multiplexed using transmitting antennas of the transmitting end 310, based on layer mapping rules. The bits are assigned to be received by one of the receiving antennas as described in FIG. 2.

For example, if four receiving antennas are provided, two bits are to be used to transmit the generated secret information during a time slot. The two bits are mapped to an information vector s based on layer mapping rules, which may be expressed by the following example of Equations 1.

$$00 \rightarrow s=[1\ 0\ 0\ 0], 01 \rightarrow s=[0\ 1\ 0\ 0], 10 \rightarrow s=[0\ 0\ 1\ 0], 11 \rightarrow s=[0\ 0\ 0\ 1] \quad (1)$$

Such a process is referred to as "layer mapping", which is performed by the layer mapping unit 313. The layer mapping rules may be predetermined and shared by the transmitting end 310 and the receiving end 330.

The precoding and antenna mapping unit 315 precodes the mapped information vector based on channel information between the transmitting antennas and the receiving antennas. The precoding and antenna mapping unit 315 also performs beamforming of the precoded information vector to the receiving end 330 by mapping the precoded information vector to each of the transmitting antennas.

The detection and antenna demapping unit 331 detects signals through each of the receiving antennas, and demaps the detected signals to the information vector transmitted from the transmitting end 310. For example, the detection and antenna demapping unit 331 may select a receiving antenna from the receiving antennas that receives strongest signals among the received signals, and demap the strongest signals to the information vector.

The layer demapping unit 333 demaps the demapped information vector to the bits used to transmit the secret information during the time slot, and that are assigned to the selected receiving antenna, based on layer demapping rules corresponding to the layer mapping rules.

The secret information obtaining unit 335 obtains the secret information by combining bits of the secret information demapped during respective successive time slots.

Figure 4:
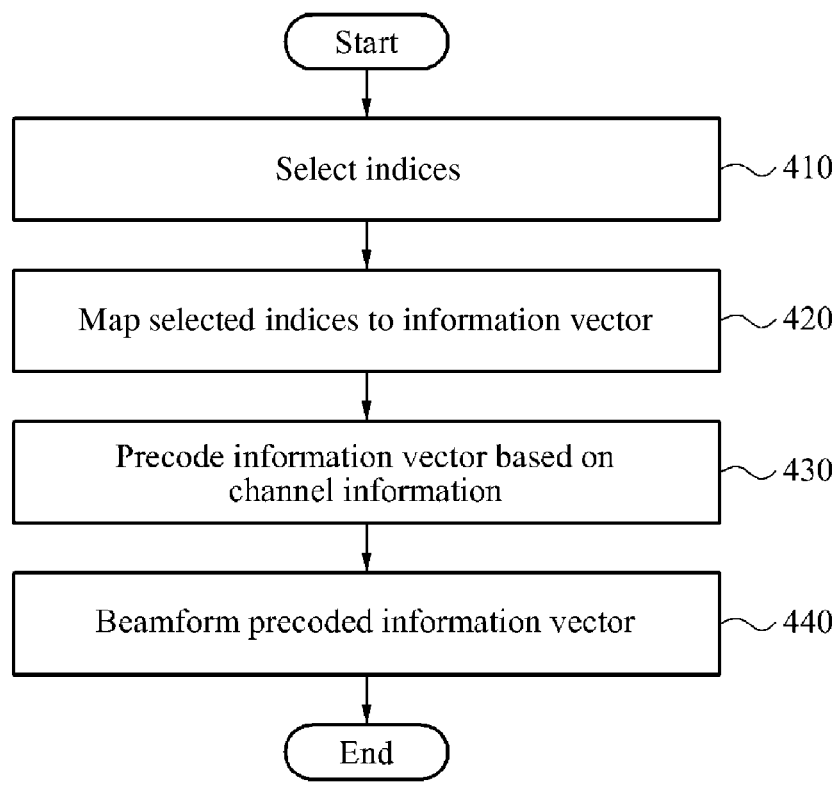
FIG. 4 is a flowchart illustrating an example of a method of transmitting secret information at a transmitting end based on MIMO multiplexing using antennas.

FIG. 4 is a flowchart illustrating an example of a method of transmitting secret information at a transmitting end based on MIMO multiplexing using antennas. Referring to FIG. 4, in operation 410, the transmitting end selects one or more indices or bits of the secret information that are assigned to a receiving antenna among receiving antennas of a receiving end, or to a combination of the receiving antennas. FIG. 2 may be referred to with respect to indices assigned to each of the receiving antennas. In addition, FIG. 7 may be referred to with respect to indices assigned to each of combinations of the receiving antennas. In more detail, the transmitting end determines a number of bits to be used to transmit the secret information during a time slot, based on a number of the receiving antennas, and selects the indices based on the determined number of the bits.

In operation 420, the transmitting end maps the selected indices to an information vector to be multiplexed through transmitting antennas of the transmitting end, based on layer mapping rules. For example, based on the layer mapping rules, the transmitting end may set, to a first value "1", an information symbol of the information vector that is mapped to the receiving antenna corresponding to the selected indices. The transmitting end may also set, to a second value "0", remaining information symbols of the information vector that are mapped to respective remaining receiving antennas corresponding to remaining indices.

If a length (in bits) of the secret information fails to correspond to multiples of the determined number of the bits, the transmitting end may add predetermined bits corresponding to a number that satisfies the following example of Equation 2, to last mapped bits of the secret information that do not correspond to the determined number of the bits, among the secret information.

[Number of bits to be transmitted during time slot–
(Total length of secret information) % (Number
of bits to be transmitted during time slot)] (2)

In Equation 2, % denotes a modulo operator. The transmitting end may determine an information vector for the remaining bits of the secret information to which the predetermined bits are added.

In operation 430, the transmitting end precodes the mapped information vector based on channel information between the transmitting antennas and the receiving antennas. The transmitting end precodes the information vector so that a strength of energy that is received through the receiving antenna corresponding to the selected indices, among the receiving antennas, may increase. Herein, the term "strength of energy" may refer to the term "amount of energy" depending on examples.

In operation 440, the transmitting end beamforms the precoded information vector to the receiving end by mapping the precoded information vector to each of the transmitting antennas.

In advance of operation 420, the transmitting end may determine whether channel coding of the secret information is to be performed, based on the channel information, and may channel code the secret information based on the determining. The transmitting end may display whether the channel coding of the secret information is to be performed, using an indicator indicating whether the channel coding of the secret information is to be performed.

Figure 5:
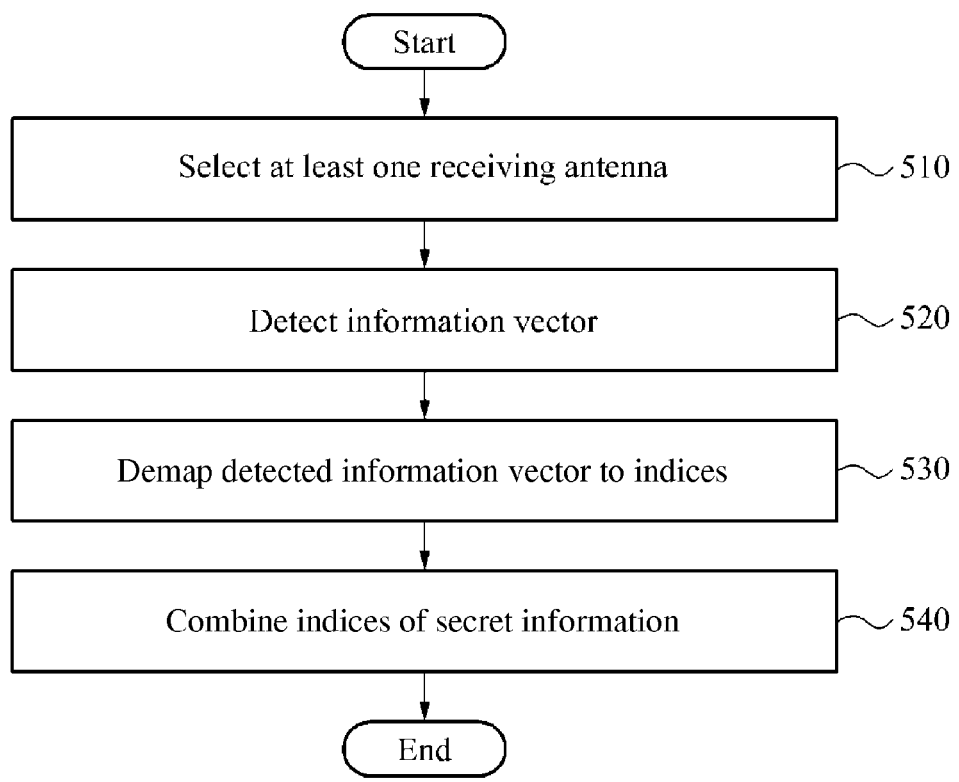
FIG. 5 is a flowchart illustrating an example of a method of receiving secret information at a receiving end based on MIMO multiplexing using antennas.

FIG. 5 is a flowchart illustrating an example of a method of receiving secret information at a receiving end based on MIMO multiplexing using antennas. Referring to FIG. 5, in operation 510, the receiving end selects at least one receiving antenna from receiving antennas of the receiving end, based on a strength of signals received through each of the receiving antennas. For example, the receiving end may select the at least one receiving antenna that receives signals including a strength greater than a predetermined threshold value, or strongest signals.

In operation 520, the receiving end detects the signals received through the at least one selected receiving antenna, and demaps the detected signals to an information vector transmitted from a transmitting end.

In operation 530, the receiving end demaps the detected information vector to indices or bits of the secret information that correspond to the at least one selected receiving antenna, based on layer demapping rules corresponding to layer mapping rules.

In operation 540, the receiving end combines indices or bits of the secret information that are demapped during respective successive time slots to obtain the secret information.

If a length (in bits) of the secret information fails to correspond to multiples of a number of bits to be used to transmit the secret information during a time slot, the receiving end may remove predetermined bits corresponding to a number that satisfies the following example of Equation 3, from last demapped bits of the secret information that do not correspond to the determined number of the bits, among the secret information.

[Number of bits to be transmitted during time slot−
(Total length of secret information) % (Number
of bits to be transmitted during time slot)]     (3)

In addition, the receiving end may determine layer mapping rules used by the transmitting end. The receiving end may channel decode the secret information using an indicator displayed by the transmitting end that indicates whether channel coding of the secret information is performed.

Figure 6:
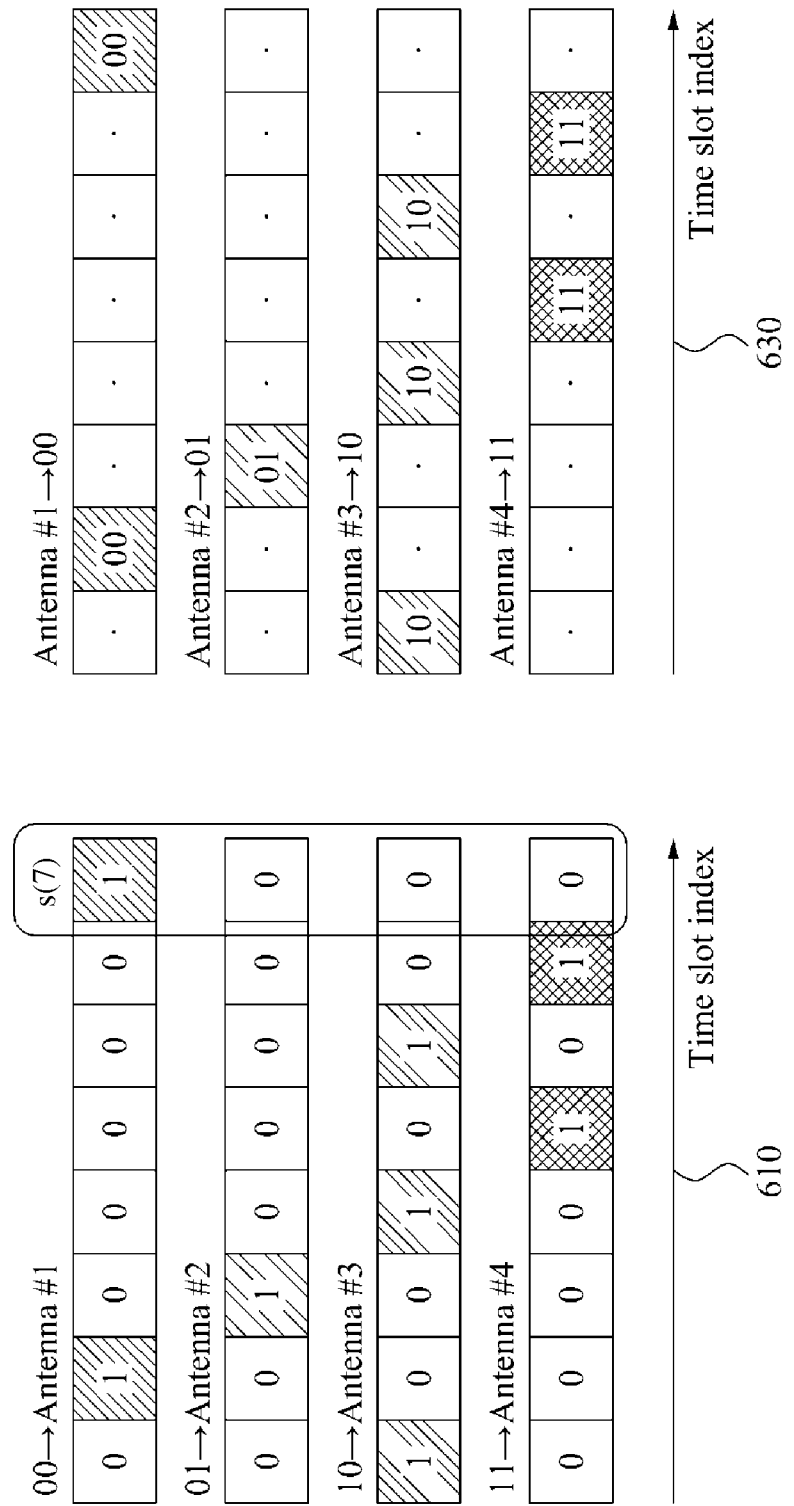
FIG. 6 is a diagram illustrating an example a result of performing layer mapping at a transmitting end, and an example of a result of performing layer demapping at a receiving end, according to the method of FIG. 2.

FIG. 6 is a diagram illustrating an example of a result of performing layer mapping at a transmitting end, and an example of a result of performing layer demapping at a receiving end, according to the method of FIG. 2. Referring to FIG. 6, four antennas are included at each of the transmitting end and the receiving end, and the secret information to be transmitted from the transmitting end to the receiving end is "10 00 01 10 11 10 11 00".

Bits included in the secret information may pass through the layer mapping unit 313 of FIG. 3 to be mapped to an information vector as shown in an example 610. For example, as shown in the example 610, bits "10" to be transmitted to a third receiving antenna of the receiving end during a first time slot is mapped to an information vector expressed by s(0)=[0 0 1 0], and bits "00" to be transmitted to a first receiving antenna of the receiving end during a last time slot is mapped to an information vector expressed by s(7)=[1 0 0 0].

In addition, the mapped information vector may pass through the precoding and antenna mapping unit 315 of FIG. 3 to be precoded to a form expressed by the following example of Equation 4.

$$X_i(n)=H(n)^{-1}s(n), \text{ for the } n\text{-th time slot} \quad (4)$$

In Equation 4, $X_i(n)=[x_1(n)\ x_2(n)\ x_3(n)\ x_4(n)]$, and $x_i(n)$ denotes a signal to be transmitted during an $n^{th}$ time slot through an $i^{th}$ receiving antenna of the receiving end. In addition, $H(n)^{-1}s(n)$ denotes an information vector s precoded based on channel information H between the transmitting end and the receiving end.

In addition, a signal transmitted from the transmitting end may pass through the detection and antenna demapping unit 331 of FIG. 3 to detect the information vector. The detected information vector may pass through the layer demapping unit 333 of FIG. 3 to be demapped to the bits included in the secret information as shown in an example 630. For example, as shown in the example 630, the information vector s(0) detected through the third receiving antenna during the first time slot is demapped to the bits "10", and the information vector s(7) detected through the first receiving antenna during the last time slot is demapped to the bits "00".

Figure 7:
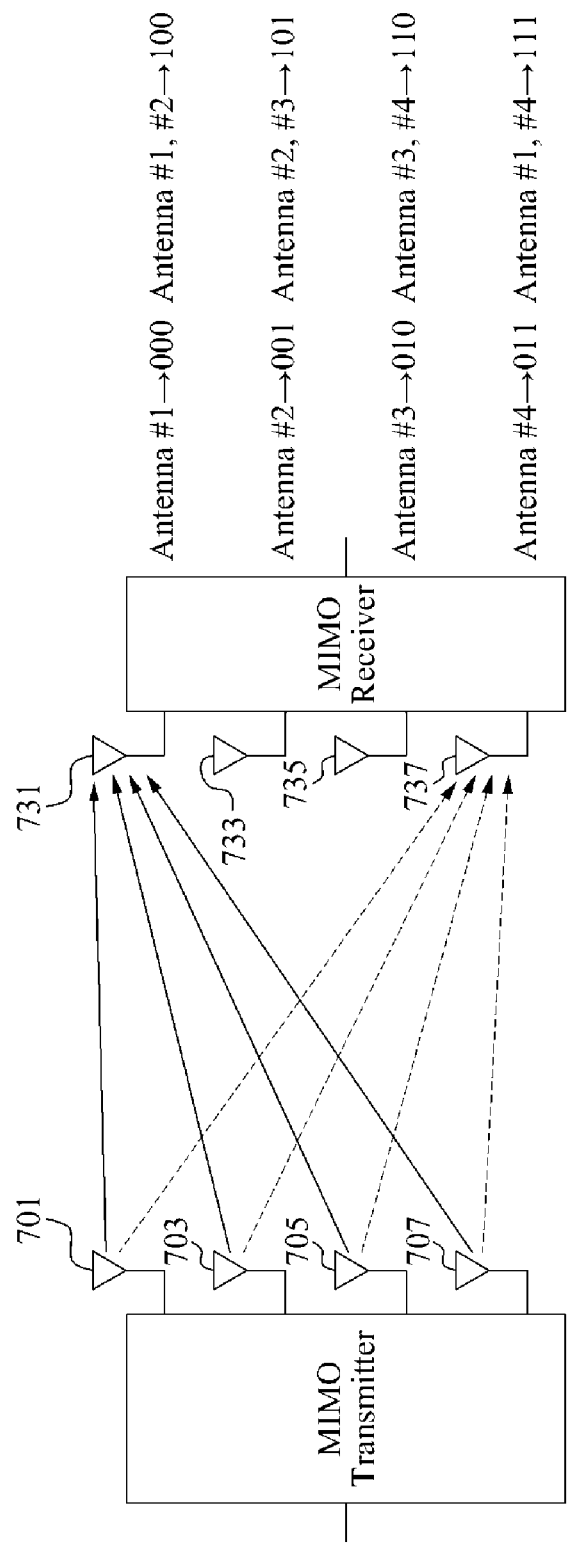
FIG. 7 is a diagram illustrating an example of a method of assigning indices to combinations of receiving antennas, respectively, based on MIMO multiplexing using antennas.

FIG. 7 is a diagram illustrating an example of a method of assigning indices to combinations of receiving antennas, respectively, based on based on MIMO multiplexing using antennas. Referring to FIG. 7, a transmitting end (i.e., an MIMO transmitter) and a receiving end (i.e., an MIMO receiver) predetermine and share layer mapping rules indicating indices or bits assigned to each of the combinations of the receiving antennas of the receiving end.

For example, based on the layer mapping rules, four transmitting antennas 701, 703, 705, and 707 of the transmitting end perform transmission beamforming to a first receiving antenna 731 of the receiving end when bits "000" are to be transmitted, and perform transmission beamforming to a second receiving antenna 733 of the receiving end when bits "001" are to be transmitted. The four transmitting antennas 701, 703, 705, and 707 further perform transmission beamforming to a third receiving antenna 735 of the receiving end when bits "010" are to be transmitted, and perform transmission beamforming to a fourth receiving antenna 737 of the receiving end when bits "011" are be transmitted.

In addition, the transmitting end performs transmission beamforming to the first receiving antenna 731 and the second receiving antenna 733 when bits "100" are to be transmitted, and performs transmission beamforming to the second receiving antenna 733 and the third receiving antenna 735 when bits "101" are to be transmitted. The transmitting end further performs transmission beamforming to the third receiving antenna 735 and the fourth receiving antenna 737 when bits "110" are to be transmitted, and performs transmission beamforming to the fourth receiving antenna 737 and the first receiving antenna 731 when bits "111" are to be transmitted.

Based on the layer mapping rules, when a strength of an energy received through each of the combinations of the receiving antennas (e.g., the first and second receiving antennas 731 and 733) is less than a predetermined threshold value, the receiving end determines that the transmitting end transmits the bits "000" when a greatest energy is received through the first receiving antenna 731, and determines that the transmitting end transmits the bits "001" when a greatest energy is received through the second receiving antenna 733. In addition, when the strength of the energy received through each of the combinations of the receiving antennas is less than the predetermined threshold value, the receiving end determines that the transmitting end transmits the bits "010" when a greatest energy is received through the third receiving antenna 735, and determines that the transmitting end transmits the bits "011" when a greatest energy is received through the fourth receiving antenna 737.

Also, the receiving end determines that the transmitting end transmits the bits "100" when an energy greater than the threshold value is received through the first receiving antenna 731 and the second receiving antenna 733, and determines that the transmitting end transmits the bits "101" when an energy greater than the threshold value is received through the second receiving antenna 733 and the third receiving antenna 735. The receiving end further determines that the transmitting end transmits the bits "110" when an energy greater than the threshold value is received through the third receiving antenna 735 and the fourth receiving antenna 737, and determines that the transmitting end transmits the bits "111" when an energy greater than the threshold value is received through the fourth receiving antenna 737 and the first receiving antenna 731.

In addition, the receiving end compares a strength of a signal received through each of the receiving antennas 731, 733, 735, and 737 to a predetermined threshold value, and selects each of the receiving antennas among the receiving antennas 731, 733, 735, and 737 that receives a signal including a strength greater than the threshold value. The receiving end also demaps the signal received through each of the selected receiving antennas to bits of secret information based on layer demapping rules corresponding to the layer mapping rules. The receiving end combines bits of the secret information demapped during respective successive time slots, thereby obtaining the secret information.

Figure 8:
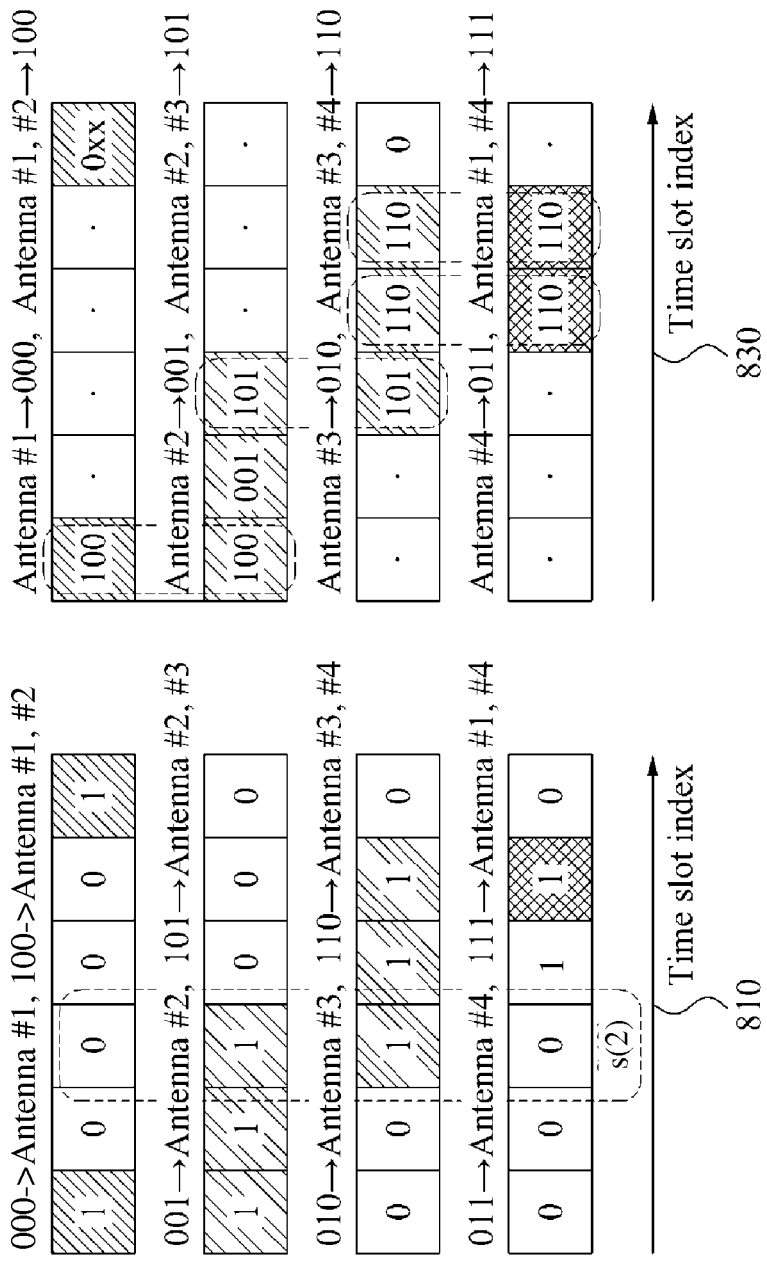
FIG. 8 is a diagram illustrating an example of a result of performing layer mapping at a transmitting end, and an example of a result of performing layer demapping at a receiving end, according to the method of FIG. 7.

FIG. 8 is a diagram illustrating an example of a result of performing layer mapping at a transmitting end, and an example of a result of performing layer demapping at a receiving end, according to the method of FIG. 7. Referring to FIG. 8, four antennas are included in each of a transmitting end and a receiving end, and the secret information to be transmitted from the transmitting end to the receiving end is "100 001 101 110 110 0".

Bits included in the secret information may pass through the layer mapping unit 313 of FIG. 3 to be mapped to an information vector as shown in an example 810. For example, as shown in the example 810, bits "100" to be transmitted to first and second receiving antennas of the receiving end during a first time slot is mapped to an information vector expressed by s(0)=[1 1 0 0], and bits "101" to be transmitted to second and third receiving antennas of the receiving end during a third time slot is mapped to an information vector expressed by s(2)=[0 1 1 0].

If a length (in bits) of the secret information fails to correspond to multiples of a number of bits to be used to transmit the secret information during a time slot, the transmitting end may add predetermined bits corresponding to a number that satisfies the above example of Equation 2, to the secret information. For example, if the length of the secret information is 16 bits, and the number of the bits to be used to transmit the secret information during the time slot is 3 bits, the length of the secret information fails to correspond to multiples of the number of the bits. Accordingly, the transmitting end adds two predetermined bits "00" corresponding to the number that satisfies the above example of Equation 2 (e.g., [3−(16% 3)]=[3−1]=2), to the secret information. Accordingly, the secret information to be transmitted from the transmitting end to the receiving end is "100 001 101 110 110 0(00)". As shown in the example 810, bits "000" to be transmitted to the first receiving antenna during a last time slot is mapped to an information vector of s(5)=[1 0 0 0].

Similar to FIG. 6, the mapped information vector may pass through the precoding and antenna mapping unit 315 of FIG. 3 to be precoded to the form expressed by the above example of Equation 4. In addition, a signal transmitted from the transmitting end may pass through the detection and antenna demapping unit 331 of FIG. 3 to detect the information vector. The detected information vector may pass through the layer demapping unit 333 of FIG. 3 to be demapped to the bits included in the secret information as shown in an example 830. For example, as shown in the example 830, the information vector s(0) detected through the first and second receiving antennas during the first time slot is demapped to the bits "100", and the information vector s(2) detected through the second and third receiving antennas during the third time slot is demapped to the bits "101".

If the length of the secret information fails to correspond to multiples of a number of bits to be used to transmit the secret information during the time slot, the transmitting end may remove or ignore predetermined bits corresponding to a number that satisfies the above example of Equation 3, from the secret information. For example, if the length of the secret information is 16 bits, and the number of the bits to be used to transmit the secret information during the time slot is 3 bits, the length of the secret information fails to correspond to multiples of the number of the bits. Accordingly, the receiving end removes two predetermined bits "00" corresponding to the number that satisfies the above example of Equation 3 (e.g., [3−(16% 3)]=[3−1]=2), from the secret information. Accordingly, the secret information received at the receiving end is "100 001 101 110 110 0". As shown in the example 830, the information vector s(5) detected through the first receiving antenna during the last time slot is demapped to the bits "0xx".

Accordingly, new secret information may be exchanged (i.e., transmitted and received), or an encryption key may be shared, by protecting the new secret information on a physical layer, or sharing randomness information unknown to a third party. The encryption key that supplements secure communication of upper layers may protect a channel, that is, may protect a packet header and communication contents, thereby preventing unintended information from being exposed to the third party.

Figure 9:
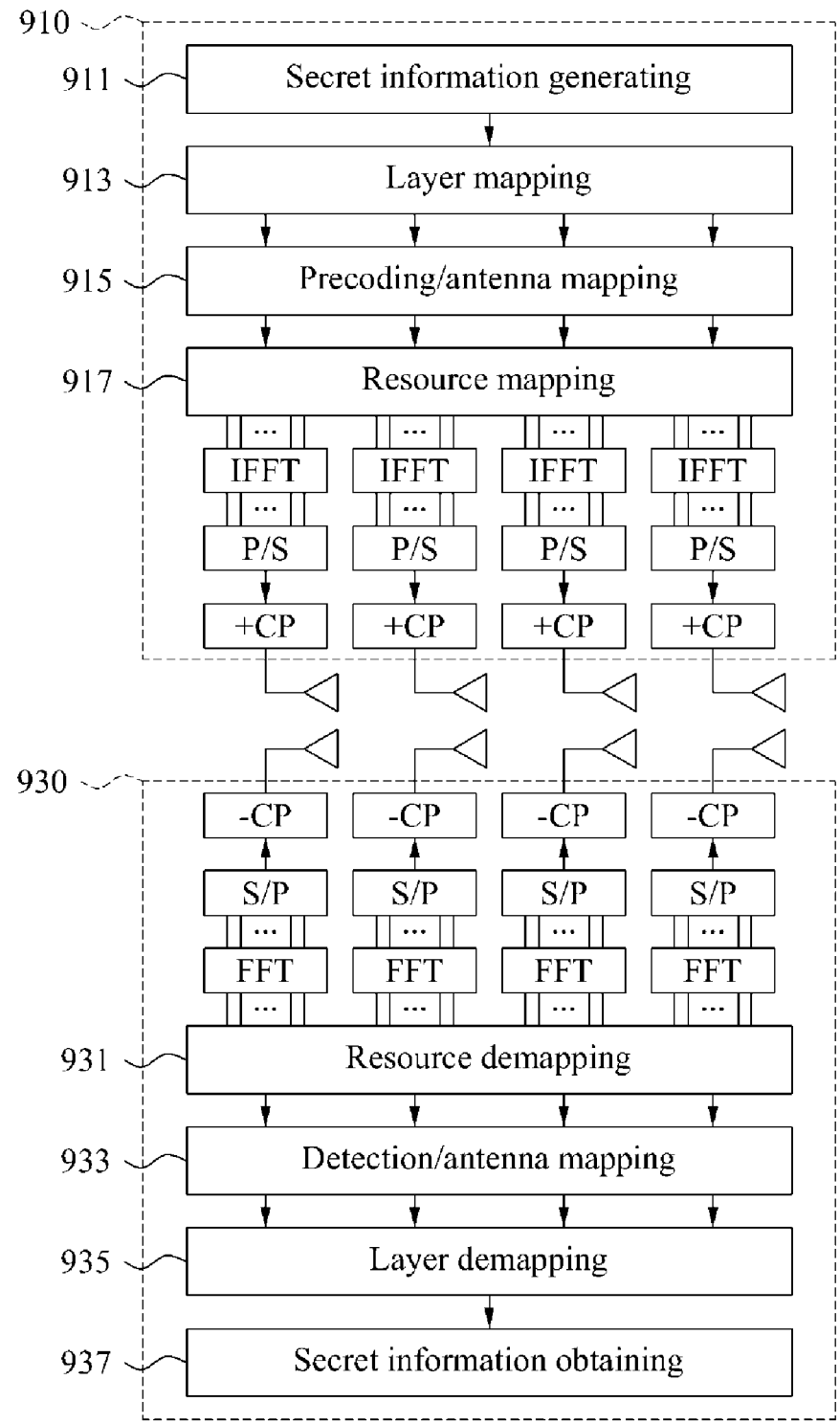
FIG. 9 is a diagram illustrating examples of a transmitting end and a receiving end that perform beamforming of secret information to different receiving antennas using respective subcarriers of orthogonal frequency division multiplexing (OFDM), based on MIMO multiplexing using antennas.

FIG. 9 is a diagram illustrating examples of a transmitting end 910 and a receiving end 930 that perform beamforming of secret information to different receiving antennas using respective subcarriers of orthogonal frequency division multiplexing (OFDM), based on MIMO multiplexing using antennas. Referring to FIG. 9, the transmitting end 910 includes a secret information generating unit 911, a layer mapping unit 913, a precoding and antenna mapping unit 915, and a resource mapping unit 917. The receiving end 930 includes a resource demapping unit 931, a detection and antenna demapping unit 933, a layer demapping unit 935, and a secret information obtaining unit 937. Operations of the units, excluding the resource mapping unit 917 and the resource demapping unit 931, are identical to the operations of the corresponding units of FIG. 3, and thus, the description of FIG. 3 can be referred hereto.

When the secret information is beamformed to the different receiving antennas of the receiving end 930 using the respective subcarriers of the OFDM, the transmitting end 910 performs transmission beamforming to the different receiving antennas based on the method described with reference to FIG. 2, and the receiving end 930 receives indices or bits of the secret information through a corresponding one of the receiving antennas that receives a greatest energy. In FIG. 9, a difference lies in that information vectors are multiplexed using at least two subcarriers.

That is, in FIG. 2, information vectors are assigned to a single subcarrier, that is, an identical frequency resource, without distinction of subcarriers, as expressed by 00→s=[1 0 0 0], 01→s=[0 1 0 0], 10→s=[0 0 1 0], 11→s=[0 0 0 1]. However, in FIG. 9, information vectors are assigned to different subcarriers, respectively, as expressed by 00→s(n)=[1 0 0 0], 01→s(n)=[0 1 0 0], 10→s(n)=[0 0 1 0], 11→s(n)=[0 0 0 1]. In this example, n=1, 2, . . . , N−1, and N denotes a number of subcarriers to be used.

In more detail, the resource mapping unit 917 maps or assigns the information vectors to different subcarriers, respectively. The resource demapping unit 931 demaps or detects the information vectors from the different subcarriers, respectively. The receiving end 930 obtains the secret information by combining bits of the secret information that are received using the respective different subcarriers.

When the secret information is beamformed to the different receiving antennas using the respective subcarriers of the OFDM, the transmitting end 910 may channel code the secret information when a channel quality is poor (i.e., less than a predetermined threshold value) to reduce an error rate, or may transmit, to the receiving end 930, a parity bit or a hash function to check whether the secret information is transmitted well without error.

Figure 10:
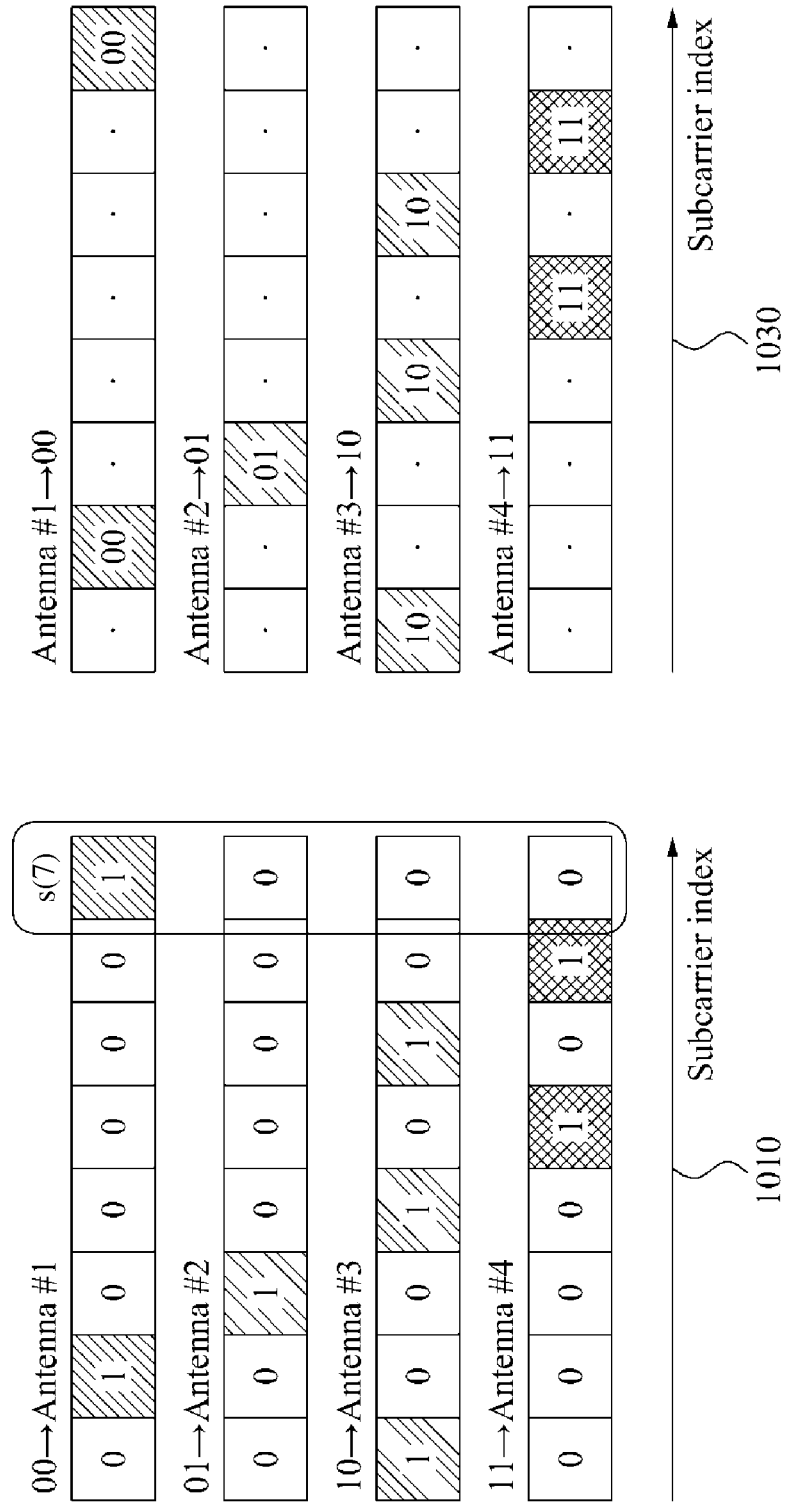
FIG. 10 is a diagram illustrating an example of a result of performing layer mapping at a transmitting end, and an example of a result of performing antenna demapping at a receiving end, according to the beamforming of FIG. 9.

FIG. 10 is a diagram illustrating an example of a result of performing layer mapping at a transmitting end, and an example of a result of performing layer demapping at a receiving end, according to the beamforming of FIG. 9. Referring to FIG. 10, four antennas are included in each of the transmitting end and the receiving end, and the secret information to be transmitted from the transmitting end to the receiving end is "10 00 01 10 11 10 11 00".

Bits included in the secret information may pass through the layer mapping unit 913 of FIG. 9 to be mapped to an information vector as shown in an example 1010. For example, as shown in the example 1010, bits "10" to be transmitted to a third receiving antenna of the receiving end is mapped to an information vector mapped to a first subcarrier and expressed by s(0)=[0 0 1 0], and bits "00" to be transmitted to a first receiving antenna of the receiving end is mapped to an information vector mapped to a last subcarrier and expressed by s(7)=[1 0 0 0].

The mapped information vector may pass through the precoding and antenna mapping unit 915 of FIG. 9 to be precoded to a form expressed by the following example of Equation 5.

$$X_i(n) = H(n)^{-1} s(n), \text{ for the } n\text{-th subcarrier} \quad (5)$$

In Equation 5, $X_i(n) = [x_1(n)\ x_2(n)\ x_3(n)\ x_4(n)]$, and $x_i(n)$ denotes a signal to be transmitted by an $n^{th}$ subcarrier through an $i^{th}$ receiving antenna of the receiving end.

The precoded information vector may pass through the resource mapping 917 of FIG. 9 to be mapped to a subcarrier. The mapped subcarrier may pass through the resource demapping 931 of FIG. 9 to be demapped to a signal.

In addition, the signal may pass through the detection and antenna demapping unit 933 of FIG. 9 to detect the information vector. The detected information vector may pass through the layer demapping unit 935 of FIG. 9 to be demapped to the bits included in the secret information as shown in an example 1030. For example, as shown in the example 1030, the information vector s(0) mapped to the first subcarrier and detected through the third receiving antenna is demapped to the bits "10", and the information vector s(7) mapped to the last subcarrier and detected through the first receiving antenna is demapped to the bits "00".

Figure 11:
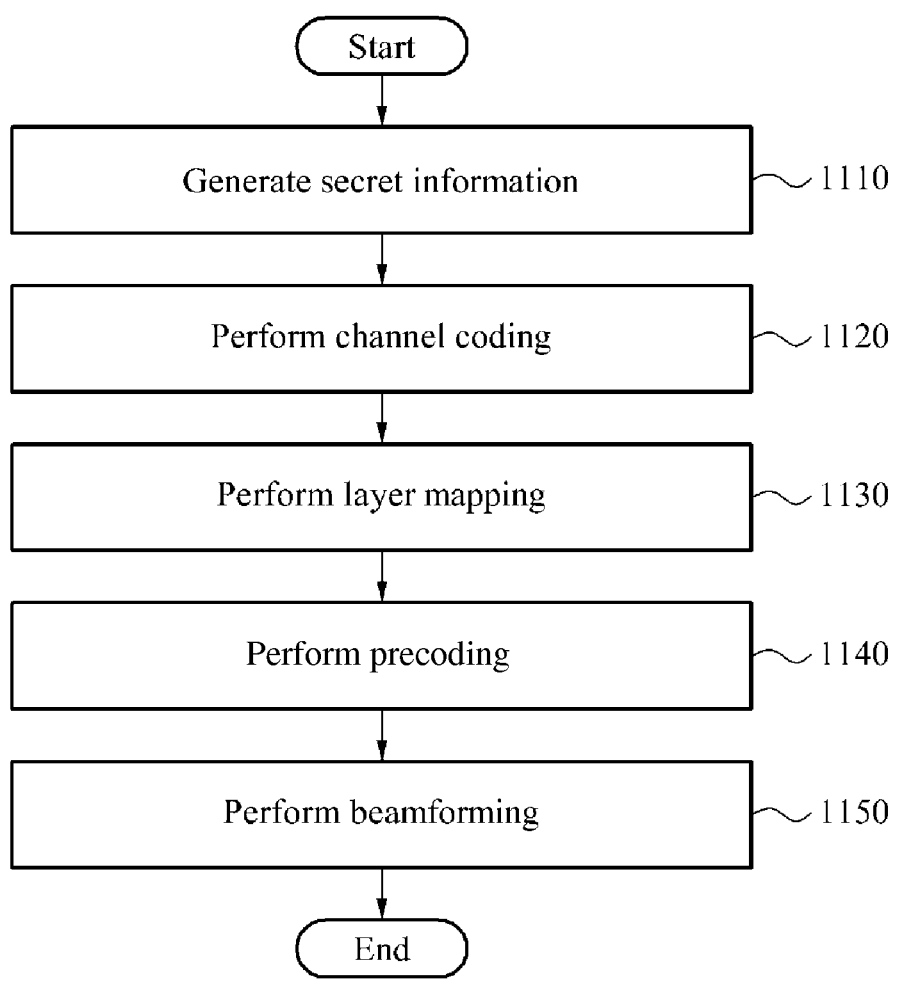
FIG. 11 is a flowchart illustrating another example of a method of transmitting secret information at a transmitting end based on MIMO multiplexing using antennas.

FIG. 11 is a flowchart illustrating another example of a method of transmitting secret information at a transmitting end based on MIMO multiplexing using antennas. Referring to FIG. 11, in operation 1110, the transmitting end generates secret information for encryption.

In operation 1120, the transmitting end performs channel coding of the generated secret information. The transmitting end may determine whether the channel coding is to be performed, based on channel information, that is, a channel quality, between transmitting antennas of the transmitting end and receiving antennas of the receiving end. When the channel quality is excellent (e.g., greater than a predetermined threshold value), the transmitting end may transmit the secret information without performing the channel coding. In other words, the channel coding of the transmitting end, and a corresponding channel decoding of the receiving end, may be unnecessary. However, when the channel quality is poor (e.g., less than the threshold value), the transmitting end may perform the channel coding to reduce an error rate, or may transmit, to the receiving end, a parity bit or a hash function to check whether the secret information is transmitted well without error.

In operation 1130, the transmitting end performs layer mapping of bits of the coded secret information based on layer mapping rules received from the receiving end to map the bits to an information vector. The transmitting end may determine the layer mapping rules, and may inform the receiving end of the layer mapping rules.

In operation 1140, the transmitting end performs precoding of the mapped information vector based on the channel information.

In operation 1150, the transmitting end performs beamforming of the precoded information vector to the receiving end by mapping the precoded information vector to each of the transmitting antennas.

Figure 12:
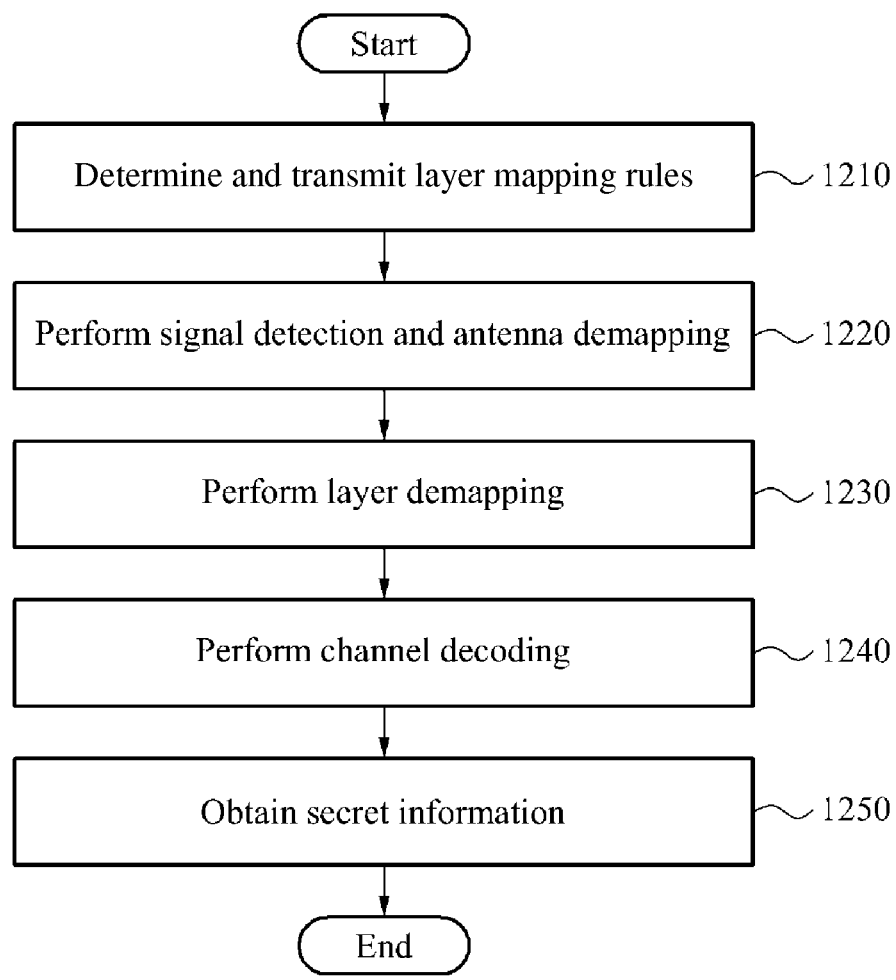
FIG. 12 is a flowchart illustrating another example of a method of receiving secret information at a receiving end based on MIMO multiplexing using antennas.

FIG. 12 is a flowchart illustrating another example of a method of receiving secret information at a receiving end based on MIMO multiplexing using antennas. Referring to FIG. 12, in operation 1210, the receiving end determines layer mapping rules, and transmits the determined layer mapping rules to a transmitting end. The receiving end may determine the layer mapping rules directly, or may receive the layer mapping rules from the transmitting end.

In operation 1220, the receiving end performs signal detection of a signal transmitted from the transmitting end, and performs antenna demapping of the signal to demap the signal to an information vector.

In operation 1230, the receiving end performs layer demapping of the demapped information vector based on layer demapping rules corresponding to the layer mapping rules, to demap the information vector to coded bits of secret information.

In operation 1240, the receiving end performs channel decoding of the coded bits of the secret information.

In operation 1250, the receiving end obtains the secret information by combining bits of the secret information decoded during respective successive time slots.

Figure 13:
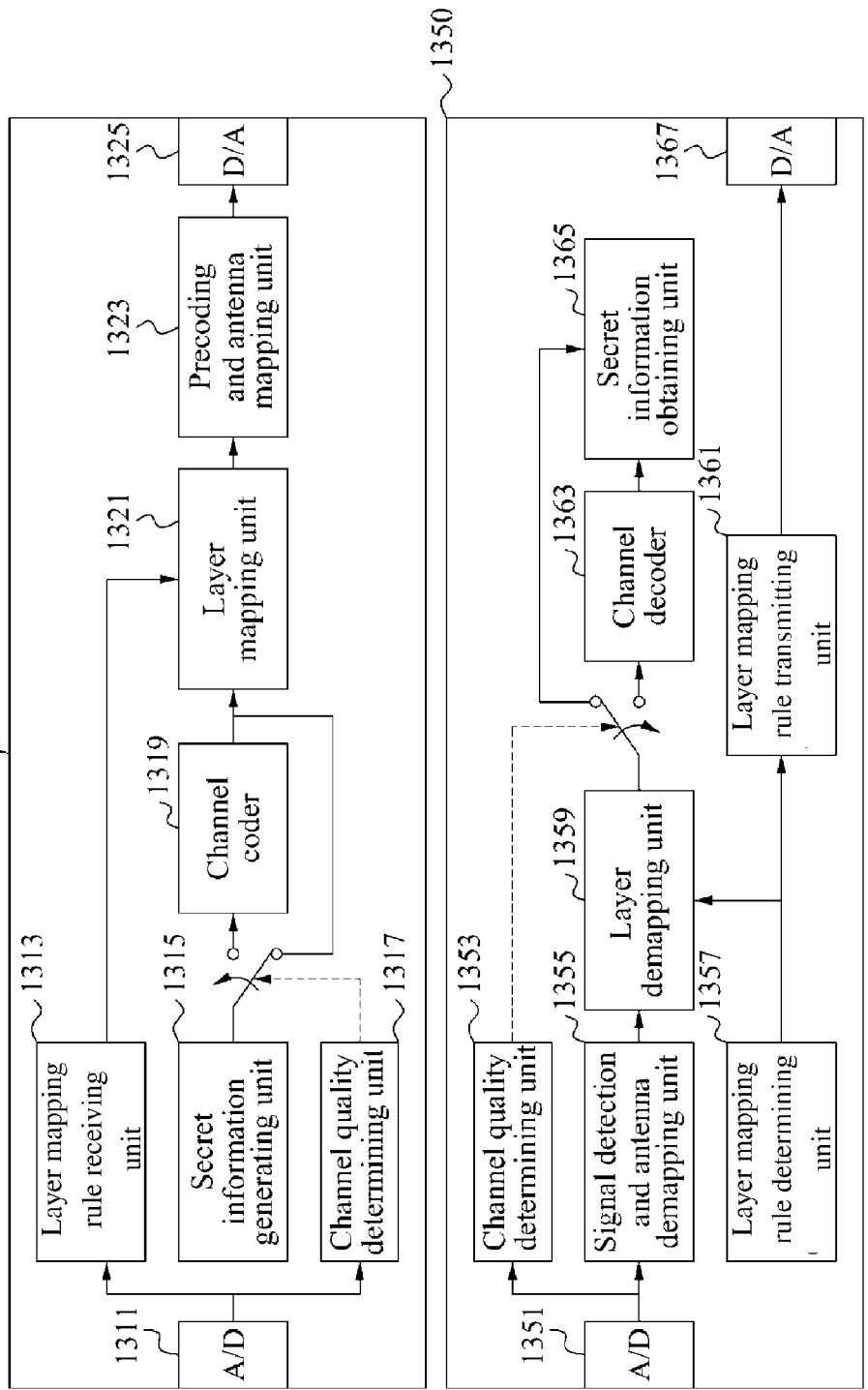
FIG. 13 is a block diagram illustrating an example of a transmitting end that transmits secret information, and an example of a receiving end that receives the secret information, based on MIMO multiplexing using antennas.

FIG. 13 is a block diagram illustrating an example of a transmitting end 1310 that transmits secret information, and an example of a receiving end 1350 that receives the secret information, based on MIMO multiplexing using antennas. Referring to FIG. 13, the transmitting end 1310 includes an analogue-to-digital (A/D) converter 1311, a layer mapping rule receiving unit 1313, a secret information generating unit 1315, a channel quality determining unit 1317, a channel coder 1319, a layer mapping unit 1321, a precoding and antenna mapping unit 1323, and a digital-to-analogue (D/A) converter 1325. The receiving end 1350 includes an A/D converter 1351, a channel quality determining unit 1353, a signal detection and antenna demapping unit 1355, a layer mapping rule determining unit 1357, a layer demapping unit 1359, a layer mapping rule transmitting unit 1361, a channel decoder 1363, a secret information obtaining unit 1365, and a D/A converter 1367.

With respect to the transmitting end 1310, the layer mapping rule receiving unit 1313 receives layer mapping rules from, e.g., the receiving end 1350. The secret information generating unit 1315 generates secret information (i.e., bits of a key) for encryption.

The channel quality determining unit 1317 determines a channel quality between the transmitting end 1310 and the receiving end 1350, based on channel information between the transmitting end 1310 and the receiving end 1350 of a digital signal converted by the A/D converter 1311. The channel quality determining unit 1317 further determines whether the channel coder 1319 is to be used based on a result of the determination. Accordingly, when the channel quality is good (e.g., greater than a predetermined threshold value), the secret information generating unit 1315 transfers the generated secret information directly to the layer mapping unit 1321, bypassing the channel coder 1319. Conversely, when the channel quality is poor (e.g., less than the threshold value), the secret information generating unit 1315 transfers the generated secret information to the channel coder 1319, which performs channel coding of the generated secret information, and the channel encoder 1319 transfers the coded secret information to the layer mapping unit 1321. The channel quality determining unit 1317 may determine whether the channel coder 1319 is to be used based on an indicator indicating whether the channel coding is to be performed. In addition, the receiving end 1350 may determine whether the channel coder 1319 is to be used.

The layer mapping unit 1321 maps bits of the secret information to an information vector to be multiplexed through transmitting antennas of the transmitting end 1310. The layer mapping unit 1321 maps the bits to the information vector based on the layer mapping rules received from the layer mapping rule receiving unit 1313.

The precoding and antenna mapping unit 1323 precodes the information vector based on the channel information, and performs beamforming of the precoded information vector to the receiving end 1350 by mapping the precoded information vector to each of the transmitting antennas. The D/A converter 1325 converts the beamformed information vector to an analog signal to be transmitted via the transmitting antennas to the receiving end 1350.

With respect to the receiving end 1350, the A/D converter 1351 receives the converted analog signal from the transmitting end 1310 via a receiving antenna of the receiving end 1350. The A/D converter 1351 further converts the received analog signal to a digital signal.

The channel quality determining unit 1353 determines the channel quality between the transmitting end 1310 and the receiving end 1350, based on channel information between the transmitting end 1310 and the receiving end 1350 of the digital signal converted by the A/D converter 1351. The channel quality determining unit 1353 further determines whether the channel decoder 1363 is to be used based on a result of the determination. Accordingly, when the channel quality is good, the layer demapping unit 1359 transfers the demapped bits of the secret information directly to the secret information obtaining unit 1365, bypassing the channel decoder 1363. Conversely, when the channel quality is poor, the layer demapping unit 1359 transfers the demapped bits to the channel decoder 1363, which performs channel decoding of the demapped bits, and the channel decoder 1363 transfers the decoded bits to the secret information obtaining unit 1365.

The signal detection and antenna demapping unit 1355 detects the digital signal converted by the A/D converter 1351 The signal detection and antenna demapping unit 1355 further demaps the digital signal to the information vector.

The layer mapping rule determining unit 1357 determines the layer mapping rules and corresponding layer demapping rules. The layer demapping unit 1359 demaps the demapped information vector to the bits of the secret information based on the layer demapping rules received from the layer mapping rule determining unit 1357.

The layer mapping rule transmitting unit 1361 transmits the determined layer mapping rules to, e.g., the transmitting end. The secret information obtaining unit 1365 obtains the secret information by combining bits of the secret information demapped during respective successive time slots. The D/A converter 1367 converts the determined layer mapping rules to an analog signal to be transmitted via receiving antennas of the receiving end 1350 to the transmitting end 1310.

Although not shown in FIG. 13, when a hash function is used to verify whether secret information possessed by the transmitting unit 1310 and the receiving unit 1350 is accurate, the transmitting unit 1310 may further include a hash code generating and transmitting unit (not shown) that generates and transmits, to the receiving end 1350, a hash code of the hash function applied to the secret information generated by the transmitting end 1310. In this example, the receiving end 1350 may further include a hash code generating unit (not shown) that generates a hash code of the hash function applied to the secret information obtained by the receiving end 1350. The receiving end 1350 may further include a hash code comparing unit (not shown) that compares the hash code received from the transmitting end 1310 to the hash code generated by the receiving end 1350. When the hash code comparing unit determines that an error exists in the obtained secret information, the receiving end 1350 may request, from the transmitting end 1310, retransmission of the secret information, or may correct the obtained secret information. In addition, when a parity bit is used for block error coding, the transmitting end 1310 and the receiving end 1350 may further include corresponding modules, respectively.

Figure 14:
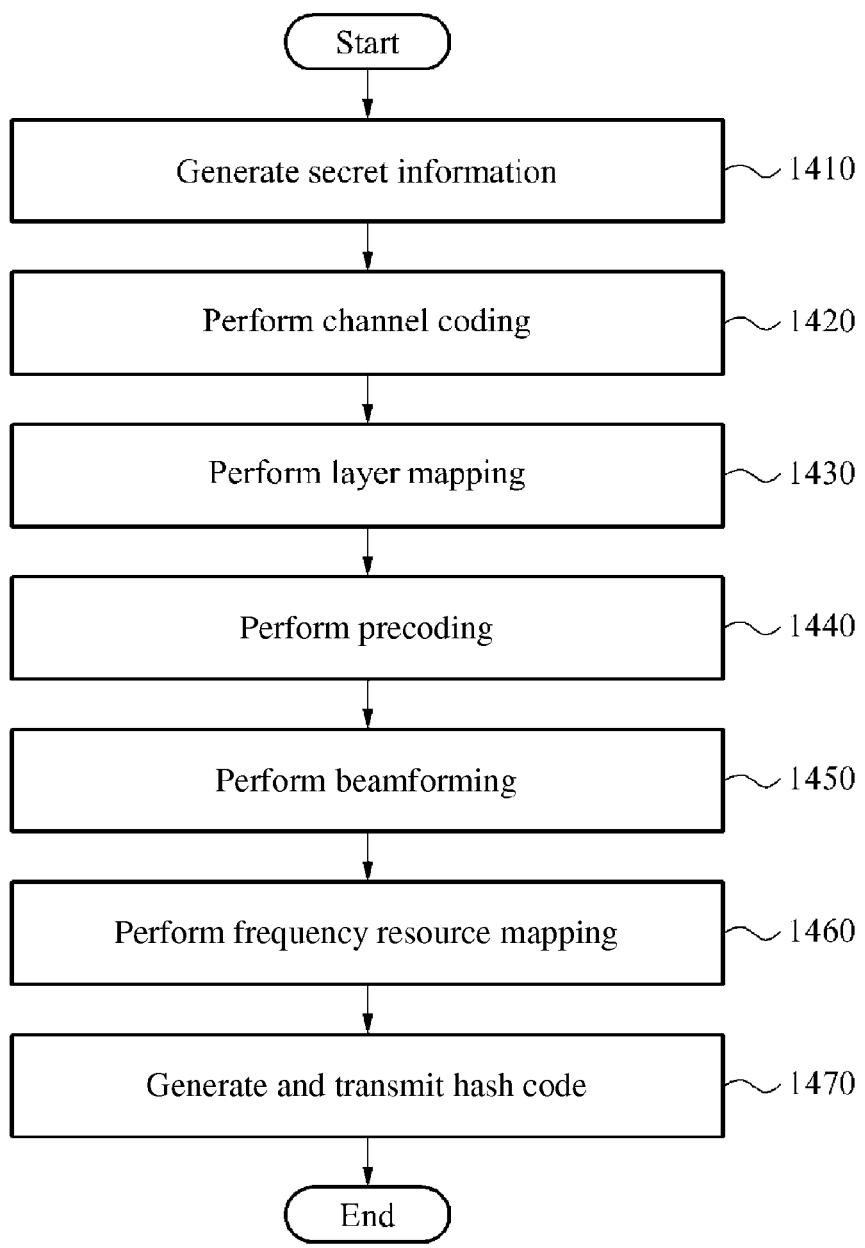
FIG. 14 is a flowchart illustrating an example of a method of beamforming, at a transmitting end, secret information to different receiving antennas using respective subcarriers of OFDM, based on MIMO multiplexing using antennas.

FIG. 14 is a flowchart illustrating an example of a method of beamforming, at a transmitting end, secret information to different receiving antennas using respective subcarriers of OFDM, based on MIMO multiplexing using antennas. Referring to FIG. 14, in operation 1410, the transmitting end generates secret information for encryption.

In operation 1420, the transmitting end performs channel coding of the generated secret information.

In operation 1430, the transmitting end performs layer mapping of bits of the coded secret information to map the bits to an information vector based on layer mapping rules received from a receiving end.

In operation 1440, the transmitting end performs precoding of the mapped information vector based on channel information between the transmitting end and the receiving end.

In operation 1450, the transmitting end performs beamforming of the precoded information vector to the receiving end by mapping the precoded information vector to each of transmitting antennas of the transmitting end.

In operation 1460, the transmitting end performs frequency resource mapping of the beamformed information vector to map the beamformed information vector to a subcarrier.

In operation 1470, the transmitting end generates and transmits, to the receiving end, a hash code of a hash function applied to the generated secret information so that the receiving end may verify whether obtained secret information is accurate. The transmitting end may further transmit, to the receiving end, a parity bit of the channel coding of the generated secret information.

Figure 15:
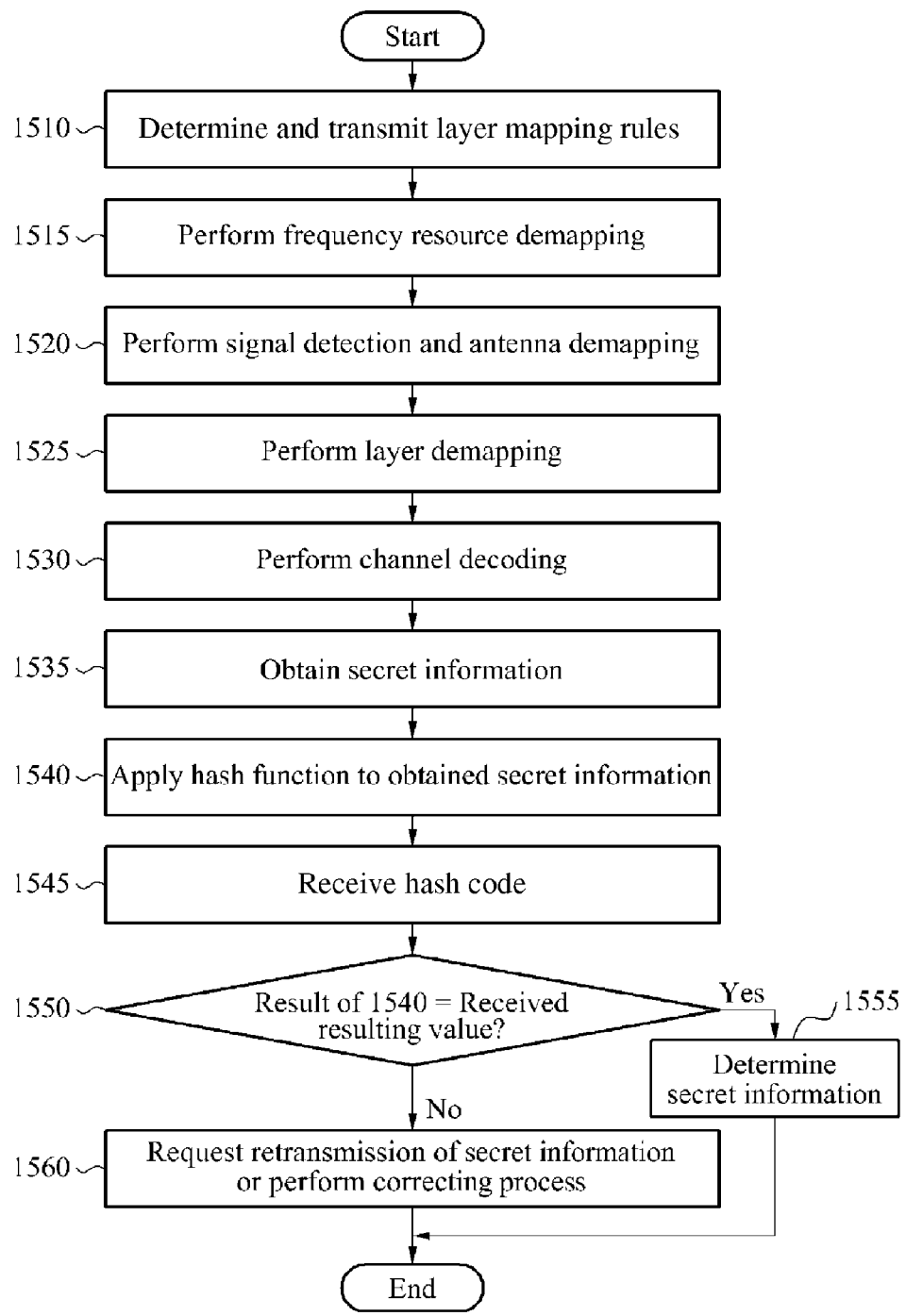
FIG. 15 is a flowchart illustrating an example of a method of receiving, at a receiving end, secret information beamformed to different receiving antennas using respective subcarriers of OFDM, based on MIMO multiplexing using antennas.

FIG. 15 is a flowchart illustrating an example of a method of receiving, at a receiving end, secret information beamformed to different receiving antennas using respective subcarriers of OFDM, based on MIMO multiplexing using antennas. Referring to FIG. 15, in operation 1510, the receiving end determines layer mapping rules, and transmits the determined layer mapping rules to a transmitting end.

In operation 1515, the receiving end performs frequency resource demapping of a subcarrier to demap the subcarrier to a signal.

In operation 1520, the receiving end performs signal detection and antenna demapping of the signal to detect the signal, and to demap the signal to an information vector.

In operation 1525, the receiving end performs layer demapping of the demapped information vector based on layer demapping rules to demap the information vector to coded bits of the secret information.

In operation 1530, the receiving end performs channel decoding of the coded bits of the secret information.

In operation 1535, the receiving end obtains the secret information by combining bits of the secret information that are decoded using respective subcarriers.

In operation 1540, the receiving end applies a hash function to the obtained secret information to obtain a hash code.

In operation 1545, the receiving end receives, from the transmitting end, another hash code of the hash function applied to the secret information generated by the transmitting end.

In operation 1550, the receiving end compares the hash code obtained by the receiving end ("a result of operation 1540") to the other hash code received from the transmitting end ("a received resulting value"). If the two hash codes are equal to each other, the method continues in operation 1555. Otherwise, the method continues in operation 1560.

In operation 1555, the receiving end determines the secret information to be accurate, and the method ends.

In operation 1560, the receiving end requests, from the transmitting end, retransmission of the secret information, or performs a correcting process with respect to the obtained secret information.

Figure 16:
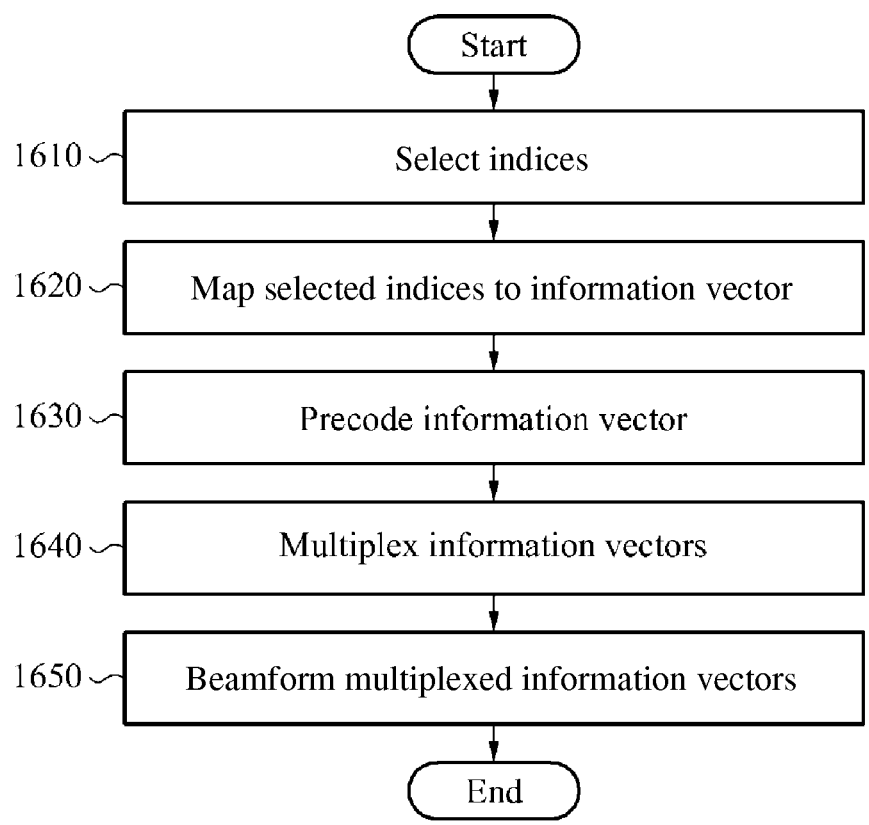
FIG. 16 is a flowchart illustrating still another example of a method of transmitting secret information at a transmitting end based on MIMO multiplexing using antennas.

FIG. 16 is a flowchart illustrating still another example of a method of transmitting secret information at a transmitting end based on MIMO multiplexing using antennas. Referring to FIG. 16, in operation 1610, the transmitting end selects one or more indices or bits of secret information that are assigned to a combination of receiving antennas of a receiving end. The description provided with reference to FIG. 7 may be referred to with respect to indices assigned to each of combinations of the receiving antennas.

In operation 1620, the transmitting end maps the selected indices to an information vector to be multiplexed through transmitting antennas of the transmitting end, based on layer mapping rules.

In operation 1630, the transmitting end precodes the mapped information vector based on channel information between the transmitting antennas and the receiving antennas.

In operation 1640, the transmitting end multiplexes information vectors precoded during respective successive time slots, using at least two subcarriers.

In operation 1650, the transmitting end beamforms the multiplexed information vectors, using the transmitting antennas. Through the above-described method, the secret information including a long length may be transmitted using a single OFDM symbol.

In response, the receiving end may perform frequency resource demapping of the subcarriers to demap the subcarriers to a received signal. The receiving end may further perform antenna demapping and layer demapping of the received signal based on antenna demapping and layer demapping rules, respectively, that are received from the transmitting end or generated by the receiving end, to obtain the secret information.

Figure 17:
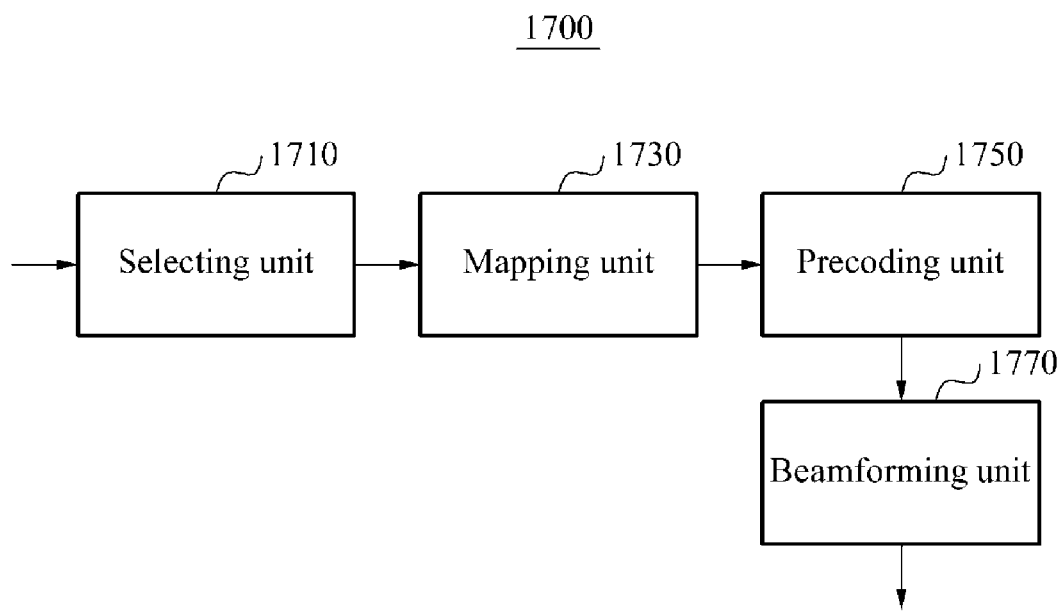
FIG. 17 is a block diagram illustrating another example of a transmitting end that transmits secret information based on MIMO multiplexing using antennas.

FIG. 17 is a block diagram illustrating another example of a transmitting end 1700 that transmits secret information based on MIMO multiplexing using antennas. Referring to FIG. 17, the transmitting end 1700 includes a selecting unit 1710, a mapping unit 1730, a precoding unit 1750, and a beamforming unit 1770.

The selecting unit 1710 selects one or more indices or bits of secret information that are assigned to a receiving antenna of a receiving end, or to combinations of receiving antennas of the receiving end. In more detail, the mapping unit 1730 determines a number of bits to be used to transmit the secret information during a time slot, based on a number of the receiving antennas, and selects the indices based on the determined number of the bits.

The mapping unit 1730 maps the selected indices to an information vector to be multiplexed through transmitting antennas of the transmitting end 1700, based on layer mapping rules. In other words, the mapping unit 1730 maps the determined number of the bits to the information vector.

The precoding unit 1750 precodes the mapped information vector based on channel information between the transmitting antennas and the receiving antennas. The precoding unit 1750 precodes the information vector so that a strength of energy that is received through the receiving antenna corresponding to the selected indices, among the receiving antennas, may increase.

The beamforming unit 1770 beamforms the precoded information vector, using the transmitting antennas.

Figure 18:
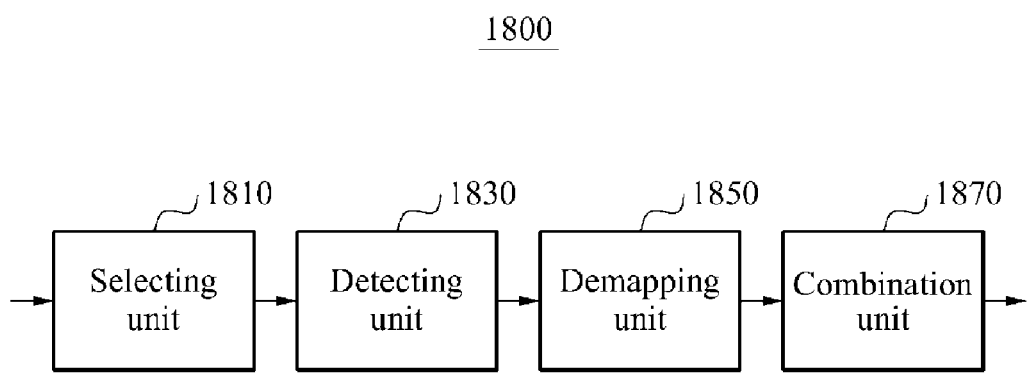
FIG. 18 is a block diagram illustrating another example of a receiving end that receives secret information based on MIMO multiplexing using antennas.

FIG. 18 is a block diagram illustrating another example of a receiving end 1800 that receives secret information based on MIMO multiplexing using antennas. Referring to FIG. 18, the receiving end 1800 includes a selecting unit 1810, a detecting unit 1830, a demapping unit 1850, and a combination unit 1870.

The selecting unit 1810 selects at least one receiving antenna from receiving antennas of the receiving end 1800 based on a strength of signals received through each of the receiving antennas.

The detecting unit 1830 detects the signals received through the at least one selected receiving antenna, and demaps the detected signals to an information vector transmitted from a transmitting end.

The demapping unit 1850 demaps the demapped information vector to indices or bits of the secret information based on layer demapping rules. The indices correspond to the at least one selected receiving antenna.

The combination unit 1870 combines indices or bits of the secret information that are demapped during respective successive time slots, to obtain the secret information.

The units described herein may be implemented using hardware components, software components, or a combination thereof. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device may also access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, that independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable recording mediums.

The computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, and optical data storage devices. Also, functional programs, codes, and code segments that accomplish the examples disclosed herein can be easily construed by programmers skilled in the art to which the examples pertain based on and using the flow diagrams and block diagrams of the figures and their corresponding descriptions as provided herein.

As a non-exhaustive illustration only, a terminal or device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of transmitting secret information at a transmitting device, based on multi-input multi-output (MIMO) multiplexing using antennas, the method comprising:
    selecting an index of the secret information that corresponds to a receiving antenna among receiving antennas;
    mapping the selected index to an information vector based on layer mapping rules, the mapping comprising
        setting, to a first value, an information symbol of the information vector that is mapped to the receiving antenna corresponding to the selected index, and
        setting, to a second value, a remaining information symbol of the information vector that is mapped to a respective remaining receiving antenna among the receiving antennas that corresponds to one or more remaining indices of the secret information;
    precoding the information vector based on channel information between transmitting antennas and the receiving antennas; and
    beamforming the precoded information vector, using the transmitting antennas.

2. The method of claim 1, further comprising:
    determining a number of bits to be used to transmit the secret information during a time slot based on a number of the receiving antennas; and
    selecting the index based on the number of the bits.

3. The method of claim 2, further comprising, if a length of the secret information fails to correspond to multiples of the number of the bits:
    adding predetermined bits corresponding to a number that satisfies the following equation, to the secret information, Number of predetermined bits=(Number of bits to be transmitted during time slot−(Total length of secret information) % (Number of bits to be transmitted during time slot)), where % denotes a modulo operator.

4. The method of claim 1, further comprising:
    determining whether channel coding of the secret information is to be performed based on the channel information; and
    displaying whether the channel coding is to be performed, using an indicator indicating whether the channel coding is to be performed.

5. The method of claim 1, further comprising:
    transmitting, to the receiving antennas, a hash code of a hash function applied to the secret information, or a parity bit of channel coding of the secret information.

6. The method of claim 1, further comprising:
    mapping the beamformed information vector to a subcarrier.

7. The method of claim 1, further comprising:
    multiplexing information vectors, using subcarriers.

8. A non-transitory computer-readable storage medium storing a program comprising instructions to cause a computer to perform the method of claim 1.

9. A method of receiving secret information at a receiving device, based on multi-input multi-output (MIMO) multiplexing using antennas, the method comprising:
    determining layer mapping rules used to map a plurality of indices of the secret information to a plurality of information vectors;
    transmitting the layer mapping rules to a transmitting device;
    selecting a receiving antenna, among receiving antennas, based on a strength of signals received through the receiving antennas, the selected antenna corresponding to a selected index among the plurality of indices;
    detecting an information vector among the plurality of information vectors from the signal received through the selected receiving antenna, wherein, based on the layer mapping rules,
        the detected information vector includes an information symbol that is set to a first value and mapped to the selected receiving antenna, and
        the detected information vector includes a remaining information symbol that is set to a second value and mapped to a respective remaining receiving antenna among the receiving antennas that corresponds to one or more remaining indices among the plurality of indices;
    demapping the detected information vector to the selected index; and
    combining the selected index and the one or more remaining indices.

10. The method of claim 9, wherein the selected receiving antenna receives the signal comprising the strength greater than a predetermined value.

11. The method of claim 9, further comprising, if a length of the secret information fails to correspond to multiples of a number of bits to be used to transmit the secret information during a time slot:
removing predetermined bits corresponding to a number that satisfies the following equation, from the secret information, Number of predetermined bits=(Number of bits to be transmitted during time slot−(Total length of secret information) % (Number of bits to be transmitted during time slot)), where % denotes a modulo operator.

12. The method of claim 9, further comprising:
performing channel decoding of the plurality of indices, based on channel information between transmitting antennas and the receiving antennas.

13. The method of claim 12, further comprising:
applying a hash function to the secret information obtained by the channel decoding, to obtain a hash code;
determining whether the hash code is equal to another hash code received from a transmitting device; and
requesting the transmitting device to retransmit the secret information, based on the determining.

14. The method of claim 9, further comprising:
performing channel decoding of the plurality of indices, using an indicator indicating whether channel coding of the plurality indices is performed.

15. A non-transitory computer-readable storage medium storing a program comprising instructions to cause a computer to perform the method of claim 9.

16. A transmitting device configured to transmit secret information based on multi-input multi-output (MIMO) multiplexing using antennas, the transmitting device comprising:
a selecting unit configured to select an index of the secret information that corresponds to a receiving antenna among receiving antennas;
a mapping unit configured to map the index to an information vector based on layer mapping rules, by
setting, to a first value, an information symbol of the information vector that is mapped to the receiving antenna corresponding to the selected index; and
setting, to a second value, a remaining information symbol of the information vector that is mapped to a respective remaining receiving antenna among the receiving antennas that corresponds to one or more remaining indices of the secret information;
a precoding unit configured to precode the information vector based on channel information between transmitting antennas and the receiving antennas; and
a beamforming unit configured to beamform the precoded information vector, using the transmitting antennas.

17. A receiving device configured to receive secret information based on multi-input multi-output (MIMO) multiplexing using antennas, the receiving device comprising:
a layer mapping rule determining unit configured to determine layer mapping rules used to map a plurality of indices of the secret information to a plurality of information vectors;
a layer mapping rule transmitting unit configured to transmit the layer mapping rules to a transmitting device;
a selecting unit configured to select a receiving antenna from receiving antennas based on a strength of a signal received through each of the receiving antennas, the selected antenna corresponding to a selected index among the plurality of indices;
a detecting unit configured to detect an information vector among the plurality of information vectors from the signal received through the selected receiving antenna, wherein, based on the layer mapping rules,
the detected information vector includes an information symbol that is set to a first value and mapped to the selected receiving antenna, and
the detected information vector includes a remaining information symbol that is set to a second value and mapped to a respective remaining receiving antenna among the receiving antennas that corresponds to one or more remaining indices among the plurality of indices;
a demapping unit configured to demap the detected information vector to the selected index; and
a combination unit configured to combine the selected index and the one or more remaining indices of the secret information.

* * * * *